United States Patent [19]

Bueler

[11] 4,455,052
[45] Jun. 19, 1984

[54] TRACTOR AIR BRAKE SYSTEM AND CONTROL VALVE MEANS THEREFOR
[75] Inventor: Richard C. Bueler, Des Peres, Mo.
[73] Assignee: Echlin Inc., Branford, Conn.
[21] Appl. No.: 290,846
[22] Filed: Aug. 7, 1981
[51] Int. Cl.³ .......................... B60T 8/26; B60T 15/36
[52] U.S. Cl. ....................................... 303/6 C; 303/7; 303/40
[58] Field of Search ............ 303/6 C, 6 A, 6 R, 6 M, 303/7, 9, 13, 71, 28, 29, 30, 40, 47, 48; 188/349; 137/102

[56] References Cited
U.S. PATENT DOCUMENTS 3,190,700  6/1965  Fites ..................................... 303/7 X
4,230,373 10/1980  Plantan ........................... 303/6 C X
4,383,717  5/1983  Bueler ..................................... 303/7

Primary Examiner—Douglas C. Butler
Attorney, Agent, or Firm—Neuman, Williams, Anderson & Olson

[57] ABSTRACT

A tractor air brake system including front wheel brake actuators, rear wheel brake actuators, and control valve structure for controlling the service air pressure delivered to the front wheel brake actuators. When a tractor is equipped with this brake system, the control valve structure operates to vary the service air pressure delivered to the front wheel brake actuators relative to that delivered to the rear wheel brake actuators in order to minimize tractor front wheel lock and loss of steering control when operating a tractor-trailer combination and to provide safe stopping when operating the tractor only.

19 Claims, 6 Drawing Figures

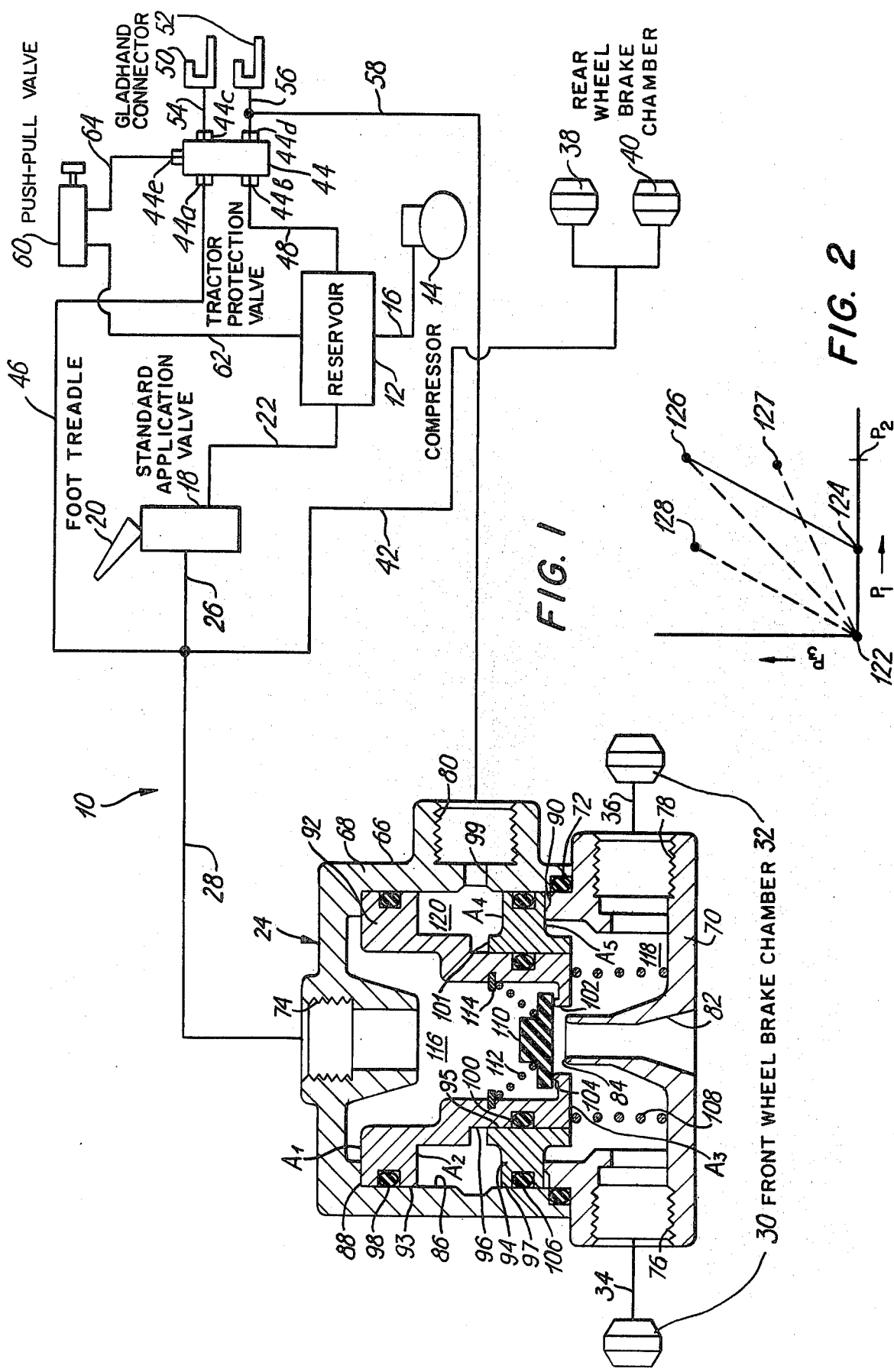

TRACTOR AIR BRAKE SYSTEM AND CONTROL VALVE MEANS THEREFOR

BACKGROUND OF THE INVENTION

When operating a tractor-trailer combination, the tractor rear wheels will have substantially more stopping capability than the tractor front wheels since the trailer weight is disposed on the tractor rear wheels. Consequently, tractor air brake systems generally have rear wheel brakes which are considerably larger than the front wheel brakes to take advantage of this difference in stopping capability between the tractor front and rear wheels. The tractor front and rear wheel brakes and the trailer brakes are sized to provide the total brake torque needed when stopping a fully loaded tractor-trailer in a safe distance during a sudden, panic stop. Unfortunately, there is a drawback to using this type of brake system in that the tractor front wheels have a tendency to lock and cause the loss of steering control when stopping a tractor-trailer on wet or icy surfaces.

In order to eliminate this drawback, tractor front wheel brakes have been either disabled or completely removed. This is undesireable because, without tractor front wheel braking, a fully loaded tractor-trailer will not be able to stop in the originally designed safe distance when making a sudden, panic stop due to the inability of the tractor rear wheel brakes and the trailer brakes to produce the designed total brake torque.

There is another condition where tractor front wheel braking is necessary to achieve the best and safest possible stopping. That condition is bobtail operation of a tractor (i.e. without a trailer). When operating a bobtail tractor, the tractor rear wheels will have substantially less stopping capability than the tractor front wheels since there is no trailer weight on the tractor rear wheels. Thus, the tractor rear wheel brakes alone may not safely stop the bobtail tractor. Therefore, tractor front wheel braking is essential.

SUMMARY OF THE INVENTION

It is an object of this invention to maintain tractor front wheel braking in a manner that will minimize tractor front wheel lock and loss of steering control when stopping a tractor-trailer combination.

It is another object of this invention to maintain tractor front wheel braking in a manner where the designed total brake torque may be produced when making a sudden, panic stop with a tractor-trailer combination.

It is a further object of this invention to maintain tractor front wheel braking in a manner that will provide safe stopping when operating a bobtail tractor.

The present invention provides a tractor air brake system which includes a source of service and emergency air pressure, front brake actuators for actuating the tractor front wheel brakes, rear brake actuators for actuating the tractor rear wheel brakes, and an application valve for delivering service air pressure from the source to the front and rear brake actuators. The system also includes control valve means connected between the application valve and the front brake actuators. The control valve means operates in a first mode to reduce the service air pressure delivered to the front brake actuators relative to the service air pressure delivered to the rear brake actuators when the tractor is operated with a trailer and the tractor brake system is connected to the trailer brake system. This minimizes tractor front wheel lock and loss of steering control when stopping a tractor-trailer. The control valve means also operates in a second mode to control the service air pressure delivered to the front brake actuators when the tractor is operated without a trailer. This provides safe stopping when operating a bobtail tractor. In its preferred embodiments, the control valve means operates in the second mode to allow the service air pressure delivered to the front brake actuators to be substantially equal to the service air pressure delivered to the rear brake actuators. In its alternative embodiments, the control valve means operates in the second mode to either increase or decrease the service air pressure delivered to the front brake actuators relative to the service air pressure delivered to the rear brake actuators.

When operating in the aforementioned first mode, the control valve means of the preferred systems prevents the delivery of service air pressure to the front brake actuators until the service air pressure being delivered to the rear brake actuators reaches a predetermined level. Then the control valve means functions to deliver service air pressure to the front brake actuators at a faster rate than service air pressure is delivered to the rear brake actuators as the service air pressure being delivered to the rear brake actuators is increased from the first-mentioned predetermined level to another, higher predetermined level. Preferably, this second-mentioned predetermined level is the maximum service air pressure available for delivery from the source to the front and rear brake actuators. Thus, the designed total brake torque may be produced when making a sudden, panic stop with a tractor-trailer.

When operating in the aforementioned second mode, the control valve means in its preferred embodiments functions to deliver service air pressure to the front brake actuators at substantially the same rate as service air pressure is delivered to the rear brake actuators. When operating in the aforementioned second mode, the control valve means in its alternative embodiments functions to deliver service air pressure to the front brake actuators at either a faster or a slower rate than service air pressure is delivered to the rear brake actuators.

DESCRIPTION OF THE DRAWINGS

FIG. 1 is a schematic of a tractor air brake system embodying the present invention with a control valve according to the invention shown in vertical cross-section;

FIG. 2 is a graph illustrating the operation of the control valve of the present invention;

DESCRIPTION OF THE PREFERRED EMBODIMENTS

Figure 1A:
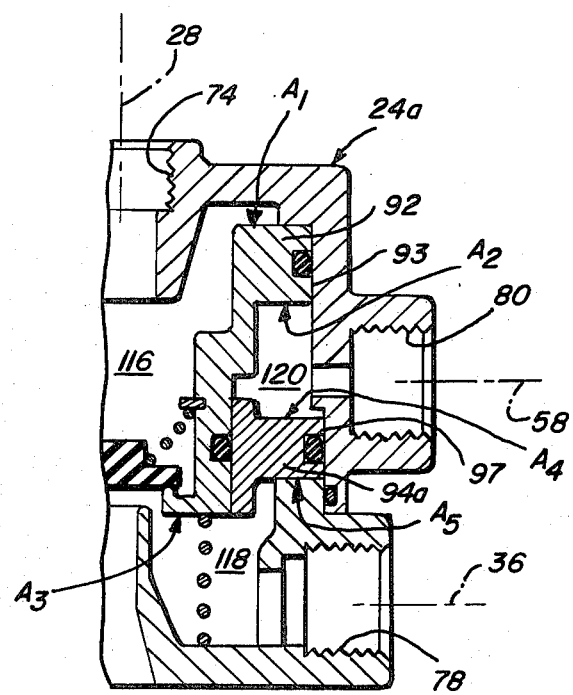
FIG. 1a is a partial cross-sectional view of an alternative embodiment of the control valve shown in FIG. 1.

Referring to FIG. 1, a tractor air brake system 10 includes a reservoir 12 which is supplied with compressed air by a compressor 14 via a conduit 16. A standard application valve 18 operated by a foot treadle 20 is connected to the reservoir 12 by a conduit 22. A control valve 24 is connected to the application valve 18 by conduits 26, 28. Front wheel brake chambers 30 and 32 are connected by conduits 34 and 36, respectively, to the control valve 24. Rear wheel brake chambers 38 and 40 are connected directly to the application valve 18 by conduits 26, 42.

A tractor protection valve 44 such as disclosed in U.S. Pat. No. 2,859,763, incorporated herein by reference, has its service inlet port 44a connected to the application valve 18 by conduits 26, 46. The emergency inlet port 44b of the tractor protection valve 44 is connected to the reservoir 12 by a conduit 48. Standard gladhand connectors 50 and 52 are connected to the service and emergency outlet ports 44c and 44d, respectively, of the tractor protection valve 44 by conduits 54 and 56, respectively. The gladhand connector 50 supplies service or control air and the gladhand connector 52 supplies emergency or supply air to a trailer air brake system (not shown). The control valve 24 is connected to the emergency outlet port 44d of the tractor protection valve 44 by conduits 56, 58. A push-pull valve 60 is connected to the reservoir 12 by a conduit 62 and to the control port 44e of the tractor protection valve 44 by a conduit 64.

The control valve 24 includes a housing 66 having an upper part 68 and a lower part 70 which are connected together with an O-ring seal 72 disposed therebetween. The upper housing part 68 has an inlet port 74 which receives the conduit 28, and the lower housing part 70 has outlet ports 76 and 78 which receive the conduits 34 and 36, respectively. A ratio port 80 in the upper housing part 68 receives the conduit 58. An exhaust port 82 in the lower housing part 70 has an annular valve seat 84 at its inner end. The upper housing part 68 includes a bore 86 with an annular shoulder 88 at its upper end, and the lower housing part 70 includes an annular shoulder 90.

A primary piston 92 and a secondary piston 94 are movably disposed in the bore 86 with the secondary piston 94 mounted concentrically about the peripheral surface 96 of the primary piston 92. The primary piston 92 carries a seal 98 in its peripheral surface 93 in contact with the wall of the bore 86 and a seal 100 in its peripheral surface 96 in contact with the inner peripheral surface 95 of the secondary piston 94. The primary piston 92 includes an opening 102 through its lower end and an annular valve seat 104 disposed around the periphery of the opening 102. The secondary piston 94 carries a seal 106 in its outer peripheral surface 97 in contact with the wall of the bore 86. It should be noted that, in this embodiment, the diameter of the primary piston peripheral surface 93 is equal to the diameter of the secondary piston outer peripheral surface 97. A return spring 108 is mounted in the housing 66 normally biasing the primary piston 92 upward into engagement with the housing shoulder 88. A check valve 110, preferably formed of rubber, is mounted in the primary piston 92 and is normally biased by a spring 112 against the valve seat 104. The upper end of the spring 112 engages a retainer ring 114 mounted on the primary piston 92.

An inlet chamber 116 is formed in the control valve housing 66 above the primary piston 92 in open fluid communication with the inlet port 74. An outlet chamber 118 is also formed in the control valve housing 66 below the primary and secondary pistons 92, 94 in open fluid communication with the outlet ports 76, 78. A ratio chamber 120 is formed between the primary and secondary pistons 92, 94 and is in open fluid communication with the ratio port 80. The ratio chamber 120 is sealed off from the inlet and outlet chambers 116, 118 by the seals 98, 100, 106. When the parts of the control valve 20 are in their unactuated positions of FIG. 1, fluid communication is closed between the inlet and outlet chambers 116, 118 by the engagement of the check valve 110 with the valve seat 104 while the outlet chamber 118 is in open fluid communication with the exhaust port 82.

An effective area $A_1$ is provided on the upper face of the primary piston 92 between the peripheral surface 93 and the opening 102, and is subjected to fluid pressure $P_1$ in the inlet chamber 116. An effective area $A_2$ is provided on an intermediate face of the primary piston 92 between the peripheral surfaces 93 and 96, and is subjected to fluid pressure $P_2$ in the ratio chamber 120. An effective area $A_3$ is provided on the lower face of the primary piston 92 between the peripheral surface 96 and the opening 102, and is subjected to fluid pressure $P_3$ in the outlet chamber 118. An effective area $A_4$ is provided on the upper face of the secondary piston 94 between its inner and outer peripheral surfaces 95 and 97, and is subjected to fluid pressure $P_2$ in the ratio chamber 120. An effective area $A_5$ is also provided on the lower face of the secondary piston 94 between its inner and outer peripheral surfaces 95 and 97, and is subjected to fluid pressure $P_3$ in the outlet chamber 118. In this embodiment, the area $A_1$ is equal to the area $A_2$ plus the area $A_3$, i.e. $A_1=A_2+A_3$, and the areas $A_4$ and $A_5$ are each equal to the area $A_2$, i.e. $A_4=A_5=A_2$. Thus, the sum of the areas $A_3$ and $A_5$ is equal to the area $A_1$. Alternatively as shown in FIG. 1a, the diameter of the secondary piston outer peripheral surface 97 is larger than the diameter of the primary piston peripheral surface 93. Each of the areas $A_4$ and $A_5$ on the secondary piston 94a is then greater than the area $A_2$ on the primary piston 92, and the sum of the areas $A_3$ and $A_5$ is greater than the area $A_1$.

OPERATION - TRACTOR-TRAILER COMBINATION

When a tractor equipped with the tractor air brake system 10 is operated with a trailer to form a tractor-trailer combination, the gladhand connector 50 is connected to the service or control line and the gladhand connector 52 is connected to the emergency or supply line of the trailer air brake system (not shown). The push-pull valve 60 is manually operated to deliver air pressure from the reservoir 12 through the conduits 62, 64 to the control port 44e of the tractor protection valve 44. This opens the tractor protection valve 44 connecting the conduit 46 to the conduit 54 for delivering service or control air pressure through the gladhand connector 50 to the trailer service line, and connecting the conduit 48 to the conduit 56 for delivering emergency or supply air pressure through the gladhand connector 52 to the trailer emergency line.

In a normal braking application with the tractor-trailer combination, the tractor air brake system 10 delays actuation of the tractor front wheel brakes while the tractor rear wheel brakes and the trailer brakes are being actuated. When the foot treadle 20 is depressed, the application valve 18 delivers service air pressure from the reservoir 12 through the conduits 22, 26, 28 to the inlet chamber 116 of the control valve 24. The application valve 18 simultaneously delivers service air pressure through the conduit 42 to the rear wheel brake chambers 38, 40 and through the conduits 46, 54 to the trailer service line. The service or control pressure $P_1$ delivered from the application valve 18 to the control valve inlet chamber 116 acts on the primary piston 92 over the area $A_1$ producing a downward force $P_1A_1$ thereon. The emergency or supply pressure $P_2$ delivered from the reservoir 12 to the ratio chamber 120 of the control valve 24 via the conduits 48, 56, 58 acts on the primary piston 92 over the area $A_2$ producing an upward force $P_2A_2$ thereon assisting the negligible force S of the spring 108. The supply pressure $P_2$ in the ratio chamber 120 also acts on the secondary piston 94 over the area $A_4$ holding it downward against the housing shoulder 90. In this embodiment the supply pressure $P_2$ in the ratio chamber 120 will be equal to the air pressure maintained in the reservoir 12 (for example, 100 psi). It should be understood, however, that the supply pressure $P_2$ in the ratio chamber 120 may be less than the air pressure maintained in the reservoir 12 by installing conventional means such as a pressure reducer in the conduit 58 or at the ratio port 80.

When a first predetermined level (for example, 50 psi) of control pressure $P_1$ represented by point 124 in FIG. 2 is reached, the downward force $P_1A_1$ on the primary piston 92 overcomes the upward forces $P_2A_2$ and S thereon. This causes the primary piston 92 to be moved downward so that the check valve 110 is biased by spring 112 against the valve seat 84 thereby closing the exhaust port 82. The downward movement of the primary piston 92 also moves the valve seat 104 away from the check valve 110 thus opening fluid communication between the inlet and outlet chambers 116, 118. Service air pressure is then delivered through the control valve 24 and the conduits 34, 36 to the front wheel brake chambers 30, 32 in order to actuate the tractor front wheel brakes.

When the primary piston valve seat 104 is moved away from the check valve 110, delivery pressure $P_3$ is established in the outlet chamber 118. The delivery pressure $P_3$ acts on the primary piston 92 over the area $A_3$ producing an upward force $P_3A_3$ thereon assisting the upward forces $P_2A_2$ and S. The primary piston 92 is moved upward so that the valve seat 104 engages the check valve 110 thereby closing fluid communication between the inlet and outlet chambers 116, 118. The control valve 24 thus assumes a lapped or holding position since the check valve 110 is in engagement with both valve seats 84 and 104.

The control valve 24 remains in this lapped position until the control pressure $P_1$ is increased to a point where the downward force $P_1A_1$ on the primary piston 92 overcomes the upward forces $P_2A_2$, $P_3A_3$ and S thereon. At that point, the primary piston 92 is moved downward again and moves the valve seat 104 away from the check valve 110 to reopen fluid communication between the inlet and outlet chambers 116, 118. The delivery pressure $P_3$ is then increased and the primary piston 92 is moved back upward to reengage the valve seat 104 with the check valve 110. As the control pressure $P_1$ is increased, the primary piston 92 is moved downward and upward to alternately open and close fluid communication between the inlet and outlet chambers 116, 118. Since the area $A_3$ acted on by the delivery pressure $P_3$ is less than the area $A_1$ acted on by the control pressure $P_1$, the delivery pressure $P_3$ is increased at a faster rate than the control pressure $P_1$. This relationship between $P_1$ and $P_3$ is represented by the line 124–126 in FIG. 2 and is determined by the formula $$P_3 = \frac{P_1A_1 - P_2A_2 - S}{A_3}.$$

The control valve 24 continues to operate in this manner until the control pressure $P_1$ reaches a second predetermined level where in this embodiment $P_1=P_2=P_3$. At this second predetermined level (for example, 100 psi) of control pressure $P_1$ represented by point 126 in FIG. 2, the forces $P_1A_1$, $P_2A_2$, $P_3A_3$ on the primary piston 92 are balanced since $A_1=A_2+A_3$ and $P_1=P_2=P_3$. The control valve 24 assumes its lapped position with the check valve 110 in engagement with both valve seats 84 and 104, and the service air pressure in the front wheel brake chambers 30, 32 is then substantially equal to the service air pressure in the rear wheel brake chambers 38, 40.

When the foot treadle 20 is then subsequently released, the control pressure $P_1$ is quickly exhausted to the atmosphere through the application valve 18. The primary piston 92 is moved upward thus moving the check valve 110 upward away from the valve seat 84. This opens the exhaust port 82, and the delivery pressure $P_3$ is quickly exhausted to the atmosphere through the exhaust port 82 as the parts of the control valve 24 return to their unactuated positions of FIG. 1.

The alternative embodiment of the control valve 24a shown in FIG. 1a operates in the same manner as the control valve 24 when the tractor is operated with a trailer.

Thus, with the tractor-trailer combination, the tractor air brake system 10 initially delivers lower service air pressure to the front wheel brake chambers 30, 32 than to the rear wheel brake chambers 38, 40 during braking in order to minimize the loss of tractor steering control.

OPERATION - TRACTOR ONLY

When the tractor equipped with the tractor air brake system 10 is operated without a trailer (i.e., in bobtail condition), the push-pull valve 60 is manually operated to seal the conduit 62 and vent the conduit 64 to the atmosphere thereby releasing the air pressure at the control port 44e of the tractor protection valve 44. This closes the tractor protection valve 44 thus sealing the conduits 46, 48 and venting the conduits 54, 56, 58 to the atmosphere.

In a normal braking application with the tractor in its bobtail condition, the tractor air brake system 10 simultaneously actuates the tractor front and rear wheel brakes. When the foot treadle 20 is depressed, the application valve 18 delivers service air pressure from the reservoir 12 through the conduits 22, 26, 28 to the inlet chamber 116 of the control valve 24. The service or control pressure $P_1$ delivered from the application valve 18 to the control valve inlet chamber 116 acts on the primary piston 92 over the area $A_1$ producing a downward force $P_1A_1$ thereon. Since there is no supply pressure $P_2$ delivered to the ratio chamber 120 via the conduit 58, the downward force $P_1A_1$ immediately moves the primary piston 92 downward as the force S of the spring 108 is quickly overcome. The downward movement of the primary piston 92 causes the check valve 110 to be biased by spring 112 against the valve seat 84 to close the exhaust port 82. The downward movement of the primary piston 92 also moves the valve seat 104 away from the check valve 110 to open fluid communication between the inlet and outlet chambers 116, 118. Service air pressure is then delivered through the control valve 24 and the conduits 34, 36 to the front wheel brake chambers 30, 32. Simultaneously, service air pressure is delivered to the rear wheel brake chambers 38, 40 through the conduit 42.

When the primary piston valve seat 104 is moved away from the check valve 110, delivery pressure $P_3$ is established in the outlet chamber 118. The delivery pressure $P_3$ acts on the secondary piston 94 over the area $A_5$ moving it upward so that the annular shoulder 101 thereon engages the annular shoulder 99 on the primary piston 92. Since the area $A_5$ is equal to the area $A_2$ in this embodiment, an upward force $P_3A_2$ is exerted on the primary piston 92. The delivery pressure $P_3$ also acts on the primary piston 92 over the area $A_3$ producing an upward force $P_3A_3$ thereon assisting the upward forces $P_3A_2$ and S. Consequently, the primary piston 92 is moved upward so that the valve seat 104 engages the check valve 110 to close fluid communication between the inlet and outlet chambers 116, 118. The control valve 24 is now in its lapped position.

The control valve 24 remains in its lapped position until the control pressure $P_1$ is increased to a point where the downward force $P_1A_1$ on the primary piston 92 overcomes the upward forces $P_3A_2$, $P_3A_3$ and S thereon. At that point, the primary piston 92 and the secondary piston 94 are moved downward together, thereby moving the valve seat 104 away from the check valve 110 to reopen fluid communication between the inlet and outlet chambers 116, 118. The delivery pressure $P_3$ is then increased and the primary piston 92 and the secondary piston 94 are moved upward together, thereby reengaging the valve seat 104 with the check valve 110. As the control pressure $P_1$ is increased, the primary and secondary pistons 92, 94 are moved downward and upward together to alternately open and close fluid communication between the inlet and outlet chambers 116, 118. Since the sum of the areas $A_3$ and $A_5$ acted on by the delivery pressure $P_3$ is equal to the area $A_1$ acted on by the control pressure $P_1$, the delivery pressure $P_3$ is increased at substantially the same rate as the control pressure $P_1$. This relationship between $P_1$ and $P_3$ is represented by the line 122–126 in FIG. 2, and is determined by the formula $P_3 = P_1 - S/A_1$. Therefore the service air pressure delivered to the front wheel brake chambers 30, 32 will always be substantially equal to the service air pressure delivered to the rear wheel brake chambers 38, 40 during a braking application on the bobtail tractor.

When the foot treadle 20 is then subsequently released, the control pressure $P_1$ is quickly exhausted to the atmosphere through the application valve 18. The primary and secondary pistons 92, 94 are moved upward to move the check valve 110 upward away from the valve seat 84. This opens the exhaust port 82, and the delivery pressure $P_3$ is quickly exhausted to the atmosphere through the exhaust port 82 as the parts of the control valve 24 return to their unactuated positions of FIG. 1.

In the alternative embodiment of the control valve 24a shown in FIG. 1a, the delivery pressure $P_3$ acts on the secondary piston 94a over the area $A_5$ moving it upward into engagement with the primary piston 92 and thereby producing an upward force $P_3A_5$ on the primary piston 92. This upward force $P_3A_5$ is assisted by the other upward forces $P_3A_3$ and S on the primary piston 92. Since the sum of the areas $A_3$ and $A_5$ acted on by the delivery pressure $P_3$ is greater than the area $A_1$ acted on by the control pressure $P_1$, the delivery pressure $P_3$ will be increased at a slower rate than the control pressure $P_1$. This relationship between $P_1$ and $P_3$ is represented by the line 122–127 in FIG. 2 and is determined by the formula $$P_3 = \frac{P_1A_1 - S}{A_3 + A_5}.$$

Therefore, the service air pressure delivered to the front wheel brake chambers 30, 32 will be less than the service air pressure delivered to the rear wheel brake chambers 38, 40 when using the control valve 24a on the bobtail tractor.

OPERATION - TRACTOR-TRAILER COMBINATION WITH TRAILER BRAKE SYSTEM FAILURE

In the event of a failure (e.g. a pressure leak) in the trailer air brake system (not shown) of the tractor-trailer combination, the tractor protection valve 44 automatically seals the conduits 46, 48 and vents the conduits 54, 56, 58 to the atmosphere. The tractor air brake system 10 then operates in the same manner as it does in the bobtail tractor condition, previously described, because the supply pressure $P_2$ will be released from the ratio chamber 120 of the control valve 24.

DESCRIPTION - SECOND EMBODIMENT

Figure 3:
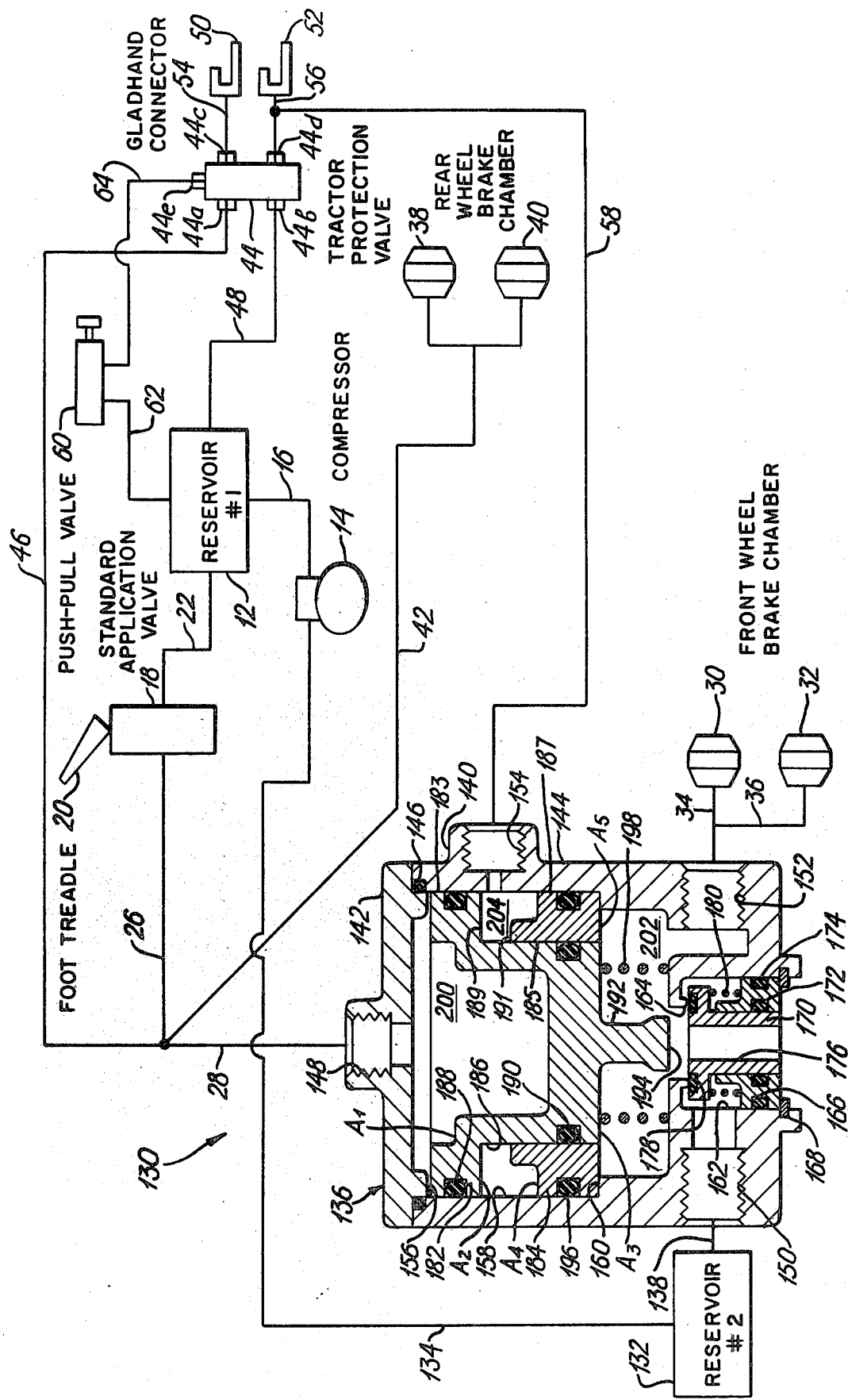
FIG. 3 is a schematic of another tractor air brake system embodying the present invention with another control valve according to the invention shown in vertical cross-section.

Referring now to FIG. 3, a tractor air brake system 130 is identical to the tractor air brake system 10 except for the components described hereafter.

A second reservoir 132 is also supplied with compressed air by the compressor 14 via a conduit 134. A relay control valve 136 is connected to the application valve 18 by the conduits 26, 28. The front wheel brake chambers 30, 32 are connected to the relay control valve 136 by the conduits 34, 36. The second reservoir 132 is also connected to the relay control valve 136 by a conduit 138.

The relay control valve 136 includes a housing 140 having an upper part 142 and a lower part 144 which are connected together with an O-ring seal 146 disposed therebetween. The upper housing part 142 has an inlet port 148 which receives the conduit 28. The lower housing part 144 has a reservoir port 150 which receives the conduit 138 and an outlet port 152 which receives the conduit 34. A ratio port 154 in the lower housing part 144 receives the conduit 58. The upper housing part 142 includes an annular shoulder 156. The lower housing part 144 includes a bore 158 with an annular shoulder 160 at its lower end. A bore 162 in the lower housing part 144 has a valve seat 164 located adjacent its upper end.

A valve guide 166 is disposed in the bore 162 and is retained therein by a snap ring 168. A valve element 170 is slidably positioned in the valve guide 166. The valve guide 166 carries seals 172, 174 in contact with the wall of the bore 162 and with the valve element 170. The valve element 170 has an exhaust opening 176 extending therethrough and an annular sealing member 178 mounted on its upper end. A spring 180 is positioned between the valve guide 166 and the valve element 170 normally biasing the valve element 170 upward so that the sealing member 178 is in engagement with the valve seat 164.

A primary piston 182 and a secondary piston 184 are movably disposed in the housing bore 158 with the secondary piston 184 mounted concentrically about the peripheral surface 186 of the primary piston 182. The primary piston carries a seal 188 in its peripheral surface 183 in contact with the wall of the bore 158 and a seal 190 in its peripheral surface 186 in contact with the inner peripheral surface 185 of the secondary piston 184. The primary piston 182 includes an extension 192 having a valve seat 194 at its lower end. The secondary piston 184 carries a seal 196 in its outer peripheral surface 187 in contact with the wall of the bore 158. It should be noted that, in this embodiment, the diameter of the primary piston peripheral surface 183 is equal to the diameter of the secondary piston outer peripheral surface 187. A return spring 198 is mounted in the housing 140 normally biasing the primary piston 182 upward into engagement with the housing shoulder 156.

An inlet chamber 200 is formed in the control valve housing 140 above the primary piston 182 in open fluid communication with the inlet port 148. An outlet chamber 202 is also formed in the control valve housing 140 below the primary and secondary pistons 182, 184 in open fluid communication with the outlet port 152. A ratio chamber 204 is formed between the primary and secondary pistons 182, 184 and is in open fluid communication with the ratio port 154. The inlet chamber 200, the outlet chamber 202 and the ratio chamber 204 are sealingly separated by the seals 188, 190, 196. When the parts of the relay control valve 136 are in their unactuated positions of FIG. 3, fluid communication is closed between the reservoir port 150 and the outlet chamber 202 by the engagement of the valve sealing member 178 with the valve seat 164 while the outlet chamber 202 is in open fluid communication with the exhaust opening 176.

An effective area $A_1$ is provided on the upper face of the primary piston 182 and is subjected to fluid pressure $P_1$ in the inlet chamber 200. An effective area $A_2$ is provided on an intermediate face of the primary piston 182 between the peripheral surfaces 183 and 186 and is subjected to fluid pressure $P_2$ in the ratio chamber 204. An effective area $A_3$ is provided on the lower face of the primary piston 182 and is subjected to fluid pressure $P_3$ in the outlet chamber 202. An effective area $A_4$ is provided on the upper face of the secondary piston 184 between its inner and outer peripheral surfaces 185 and 187 and is subjected to fluid pressure $P_2$ in the ratio chamber 204. An effective area $A_5$ is also provided on the lower face of the secondary piston 184 between its inner and outer peripheral surfaces 185 and 187 and is subjected to fluid pressure $P_3$ in the outlet chamber 202. In this embodiment, the area $A_1$ is equal to the sum of the areas $A_2$ and $A_3$, i.e. $A_1 = A_2 + A_3$, and the areas $A_4$ and $A_5$ are each equal to the area $A_2$, i.e. $A_4 = A_5 = A_2$. Thus, the sum of the areas $A_3$ and $A_5$ is equal to the area $A_1$.

Figure 3A:
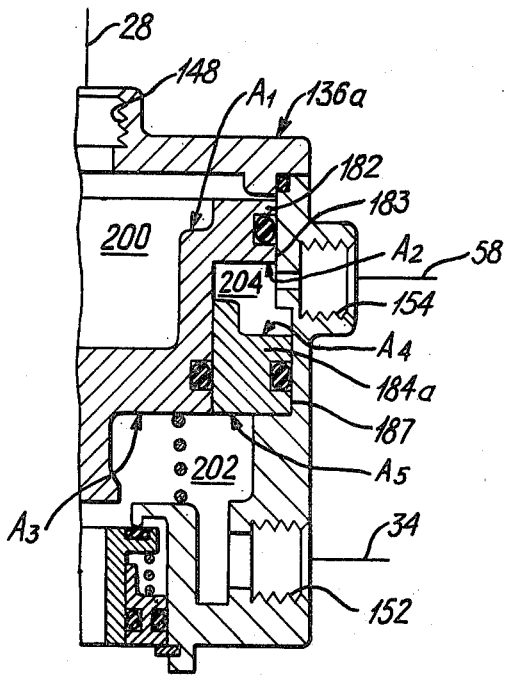
FIGS. 3a and 3b are partial cross-sectional views of alternative embodiments of the control valve shown in FIG. 3.

Alternatively as shown in FIG. 3a, the diameter of the secondary piston outer peripheral surface 187 is larger than the diameter of the primary piston peripheral surface 183. Each of the areas $A_4$ and $A_5$ on the secondary piston 184a is then greater than the area $A_2$ on the primary piston 182, and the sum of the areas $A_3$ and $A_5$ is greater than the area $A_1$.

Figure 3B:
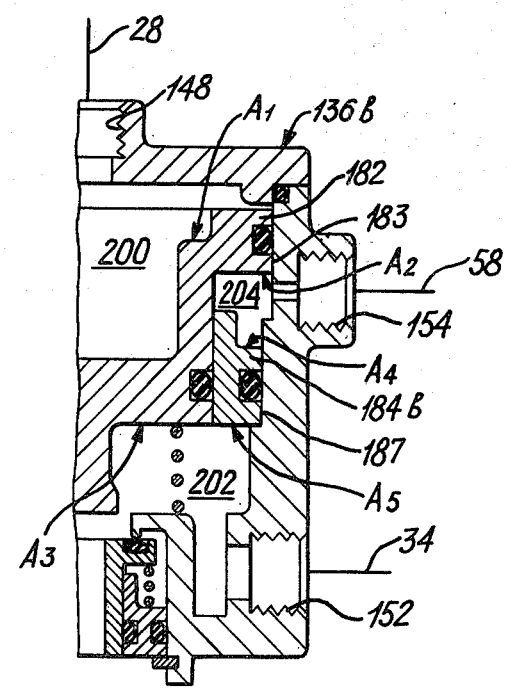

As another alternative shown in FIG. 3b, the diameter of the secondary piston outer peripheral surface 187 is smaller than the diameter of the primary piston peripheral surface 183. Each of the areas $A_4$ and $A_5$ on the secondary piston 184b is then less than the area $A_2$ on the primary piston 182, and the sum of the areas $A_3$ and $A_5$ is equal to the area $A_1$.

OPERATION - TRACTOR-TRAILER COMBINATION

When a tractor equipped with the tractor air brake system 130 is operated with a trailer to form a tractor-trailer combination, the gladhand connector 50 is connected to the service or control line and the gladhand connector 52 is connected to the emergency or supply line of the trailer air brake system (not shown). The push-pull valve 60 is manually operated to deliver air pressure from the reservoir 12 through the conduits 62, 64 to the control port 44e of the tractor protection valve 44. This opens the tractor protection valve 44 connecting the conduit 46 to the conduit 54 for delivering service or control air pressure through the gladhand connector 50 to the trailer service line, and connecting the conduit 48 to the conduit 56 for delivering emergency or supply air pressure to the trailer emergency line.

In a normal braking application with the tractor-trailer combination, the tractor air brake system 130 delays actuation of the tractor front wheel brakes while the tractor rear wheel brakes and the trailer brakes are being actuated. When the foot treadle 20 is depressed, the application valve 18 delivers service air pressure from the reservoir 12 through the conduits 22, 26, 28 to the inlet chamber 200 of the relay control valve 136. The application valve 18 simultaneously delivers service air pressure through the conduit 42 to the rear wheel brake chambers 38, 40 and through the conduits 46, 54 to the trailer service line. The service or control pressure $P_1$ delivered from the application valve 18 to the relay control valve inlet chamber 200 acts on the primary piston 182 over the area $A_1$ producing a downward force $P_1A_1$ thereon. The emergency or supply pressure $P_2$ delivered from the reservoir 12 to the ratio chamber 204 of the relay control valve 136 via the conduits 48, 56, 58 acts on the primary piston 182 over the area $A_2$ producing an upward force $P_2A_2$ thereon assisting the force S of the spring 198. The supply pressure $P_2$ in the ratio chamber 204 also acts on the secondary piston 184 over the area $A_4$ holding it downward against the housing shoulder 160. In this embodiment the supply pressure $P_2$ in the ratio chamber 204 will be equal to the air pressure maintained in the reservoir 12 (for example, 100 psi). It should be understood, however, that the supply pressure $P_2$ in the ratio chamber 204 may be less than the air pressure in the reservoir 12 by installing conventional means such as a pressure reducer in the conduit 58 or at the ratio port 154.

When a first predetermined level (for example, 50 psi) of control pressure $P_1$ represented by point 124 in FIG. 2 is reached, the downward force $P_1A_1$ on the primary piston 182 overcomes the upward forces $P_2A_2$ and S thereon. This causes the primary piston 182 to be moved downward so that the valve seat 194 on its extension 192 is engaged with the sealing member 178 carried by the valve element 170 thereby closing the valve exhaust opening 176. The downward movement of the primary piston 182 also moves the valve element 170 downward which moves the sealing member 178 away from the valve seat 164 thus opening fluid communication between reservoir port 150 and the outlet chamber 202. Service air pressure is then delivered from the reservoir 132 through the conduit 138, the relay control valve 136, and the conduits 34, 36 to the front wheel brake chambers 30, 32 in order to actuate the tractor front wheel brakes.

When the valve sealing member 178 is moved away from the valve seat 164, delivery pressure $P_3$ is established in the outlet chamber 202. The delivery pressure $P_3$ acts on the primary piston 182 over the area $A_3$ producing an upward force $P_3A_3$ thereon assisting the upward forces $P_2A_2$ and S. The primary piston 182 is moved upward allowing the valve element 170 to be biased upward by the spring 180. The valve element 170 is moved upward to engage the sealing member 178 with the valve seat 164 thereby closing fluid communication between the reservoir port 150 and the outlet chamber 202. The primary piston valve seat 194 remains in engagement with the valve sealing member 178. Therefore, the relay control valve 136 is in a lapped position since the valve sealing member 178 is in engagement with both valve seats 164 and 194.

The relay control valve 136 remains in this lapped position until the control pressure $P_1$ is increased to a point where the downward forces $P_1A_1$ on the primary piston 182 overcomes the upward forces $P_2A_2$, $P_3A_3$ and S thereon. At that point, the primary piston 182 is moved downward again and moves the valve sealing member 178 away from the valve seat 164 to reopen fluid communication between the reservoir port 150 and the outlet chamber 202. The delivery pressure $P_3$ is then increased and the primary piston 182 is moved back upward to allow the valve sealing member 178 to be moved back into engagement with the valve seat 164. As the control pressure $P_1$ is increased, the primary piston 182 is moved downward and upward to alternately open and close fluid communication between the reservoir port 150 and the outlet chamber 202. Since the area $A_3$ acted on by the delivery pressure $P_3$ is less than the area $A_1$ acted on by the control pressure $P_1$, the delivery pressure $P_3$ is increased at a faster rate than the control pressure $P_1$. This relationship between $P_1$ and $P_3$ is represented by the line 124–126 in FIG. 2 and is determined by the formula $$P_3 = \frac{P_1A_1 - P_2A_2 - S}{A_3}.$$

The relay control valve 136 continues to operate in this manner until the control pressure $P_1$ reaches a second predetermined level where in this embodiment $P_1=P_2=P_3$. At this second predetermined level (for example, 100 psi) of control pressure $P_1$ represented by point 126 in FIG. 2, the forces $P_1A_1$, $P_2A_2$, $P_3A_3$ on the primary piston 182 are balanced since $A_1=A_2+A_3$ and $P_1=P_2=P_3$. The relay control valve 136 assumes its lapped position with the valve sealing member 178 in engagement with both valve seats 164 and 194, and the service air pressure in the front wheel brake chambers 30, 32 is then substantially equal to the service air pressure in the rear wheel brake chambers 38, 40.

When the foot treadle 20 is then subsequently released, the control pressure $P_1$ is quickly exhausted to the atmosphere through the application valve 18. The primary piston 182 is moved upward thus moving the valve seat 194 away from the valve sealing member 178. This opens the valve exhaust opening 176, and the delivery pressure $P_3$ is quickly exhausted to the atmosphere through the valve exhaust opening 176 as the parts of the relay control valve 136 return to their unactuated positions of FIG. 3.

The alternative embodiments of the relay control valve 136a, 136b shown in FIGS. 3a and 3b operate in the same manner as the relay control valve 136 when the tractor is operated with a trailer.

Thus, with the tractor-trailer combination, the tractor air brake system 130 initially delivers lower service air pressure to the front wheel brake chambers 30, 32 than to the rear wheel brake chambers 38, 40 during braking in order to minimize the loss of tractor steering control.

OPERATION - TRACTOR ONLY

When the tractor equipped with the tractor air brake system 130 is operated without a trailer (i.e. in bobtail condition), the push-pull valve 60 is manually operated to seal the conduit 62 and vent the conduit 64 to the atmosphere thereby releasing the air pressure at the control port 44e of the tractor protection valve 44. This closes the tractor protection valve 44 thus sealing the conduits 46, 48 and venting the conduits 54, 56, 58 to the atmosphere.

In a normal braking application with the tractor in its bobtail condition, the tractor air brake system 130 simultaneously actuates the tractor front and rear wheel brakes. When the foot treadle 20 is depressed, the application valve 18 delivers service air pressure from the reservoir 12 through the conduits 22, 26, 28 to the inlet chamber 200 of the relay control valve 136. The service or control pressure $P_1$ delivered from the application valve 18 to the relay control valve inlet chamber 200 acts on the primary piston 182 over the area $A_1$ producing a downward force $P_1A_1$ thereon. Since there is no supply pressure $P_2$ delivered to the ratio chamber 204 via the conduit 58, the downward force $P_1A_1$ immediately moves the primary piston 182 downward as the force S of the spring 198 is quickly overcome. The downward movement of the primary piston 182 engages the valve seat 194 thereon with the valve sealing member 178 to close the valve exhaust opening 176. The downward movement of the primary piston 182 also moves the valve element 170 downward thus moving the sealing member 178 away from the valve seat 164 to open fluid communication between the reservoir port 150 and the outlet chamber 202. Service air pressure is then delivered from the reservoir 132 through the conduit 138, the relay control valve 136, and the conduits 34, 36 to the front wheel brake chambers 30, 32. Simultaneously, service air pressure is delivered to the rear wheel brake chambers 38, 40 through the conduit 42.

When the valve sealing member 178 is moved away from the valve seat 164, delivery pressure $P_3$ is established in the outlet chamber 202. The delivery pressure $P_3$ acts on the secondary piston 184 over the area $A_5$ moving it upward so that the annular shoulder 191 thereon engages the annular shoulder 189 on the primary piston 182. Since the area $A_5$ is equal to the area $A_2$ in this embodiment, an upward force $P_3A_2$ is exerted on the primary piston 182. The delivery pressure $P_3$ also acts on the primary piston 182 over the area $A_3$ producing an upward force $P_3A_3$ thereon assisting the upward forces $P_3A_2$ and S. Consequently, the primary piston 182 is moved upward allowing the valve element 170 to be biased upward by the spring 180. The valve element 170 is moved upward engaging the sealing member 178 with the valve seat 164 to close fluid communication between the reservoir port 150 and the outlet chamber 202. The primary piston valve seat 194 remains in engagement with the valve sealing member 178. The relay control valve 136 is now in its lapped position.

The relay control valve 136 remains in its lapped position until the control pressure $P_1$ is increased to a point where the downward force $P_1A_1$ on the primary piston 182 overcomes the upward forces $P_3A_2$, $P_3A_3$ and S thereon. At that point, the primary piston 182 and the secondary piston 184 are moved downward together, thereby moving the valve sealing member 178 away from the valve seat 164 to reopen fluid communication between the reservoir port 150 and the outlet chamber 202. The delivery pressure $P_3$ is then increased and the primary piston 182 and the secondary piston 184 are moved upward together to allow the valve sealing member 178 to be moved back into engagement with the valve seat 164. As the control pressure $P_1$ is increased, the primary and secondary pistons 182, 184 are moved downward and upward together to alternately open and close fluid communication between the reservoir port 150 and the outlet chamber 202. Since the sum of the areas $A_3$ and $A_5$ acted on by the delivery pressure $P_3$ is equal to the area $A_1$ acted on by the control pressure $P_1$, the delivery pressure $P_3$ is increased at substantially the same rate as the control pressure $P_1$. This relationship between $P_1$ and $P_3$ is represented by the line 122–126 in FIG. 2 and is determined by the formula $P_3 = P_1 - S/A_1$. Therefore, the service air pressure delivered to the front wheel brake chambers 30, 32 will always be substantially equal to the service air pressure delivered to the rear wheel brake chambers 38, 40 during a braking application on the bobtail tractor.

When the foot treadle 20 is then subsequently released, the control pressure $P_1$ is quickly exhausted to the atmosphere through the application valve 18. The primary and secondary pistons 182, 184 are moved upward moving the valve seat 194 away from the valve sealing member 178. This opens the valve exhaust opening 176, and the delivery pressure $P_3$ is quickly exhausted to the atmosphere through the valve exhaust opening 176 as the parts of the relay control valve 136 return to their unactuated positions of FIG. 3.

In the alternative embodiment of the relay control valve 136a shown in FIG. 3a, the delivery pressure $P_3$ acts on the secondary piston 184a over the area $A_5$ moving it upward into engagement with the primary piston 182 and thereby producing an upward force $P_3A_5$ on the primary piston 182. This upward force $P_3A_5$ is assisted by the other upward forces $P_3A_3$ and S on the primary piston 182. Since the sum of the areas $A_3$ and $A_5$ acted on by the delivery pressure $P_3$ is greater than the area $A_1$ acted on by the control pressure $P_1$, the delivery pressure $P_3$ will be increased at a slower rate than the control pressure $P_1$. This relationship between $P_1$ and $P_3$ is represented by the line 122–127 in FIG. 2 and is determined by the formula $$P_3 = \frac{P_1A_1 - S}{A_3 + A_5}.$$

Therefore, the service air pressure delivered to the front wheel brake chambers 30, 32 will be less than the service air pressure delivered to the rear wheel brake chambers 38, 40 when using the relay control valve 136a on the bobtail tractor.

In the alternative embodiment of the relay control valve 136b shown in FIG. 3b, the delivery pressure $P_3$ will be increased at a faster rate than the control pressure $P_1$ because the sum of the areas $A_3$ and $A_5$ acted on by the delivery pressure $P_3$ is less than the area $A_1$ acted on by the control pressure $P_1$. This relationship between $P_1$ and $P_3$ is represented by the line 122–128 in FIG. 2 and is determined by the same formula $$P_3 = \frac{P_1A_1 - S}{A_3 + A_5}.$$

Therefore, the service air pressure delivered to the front wheel brake chambers 30, 32 will be greater than the service air pressure delivered to the rear wheel brake chambers 38, 40 when using the relay control valve 136b on the bobtail tractor.

TRACTOR-TRAILER COMBINATION WITH TRAILER BRAKE SYSTEM FAILURE

In the event of a failure (e.g. a pressure leak) in the trailer air brake system (not shown) of the tractor-trailer combination, the tractor protection valve 44 automatically seals the conduits 46, 48 and vents the conduits 54, 56, 58 to the atmosphere. The tractor air brake system 130 then operates in the same manner as it does in the bobtail tractor condition, previously described, because the supply pressure $P_2$ will be released from the ratio chamber 204 of the relay control valve 136.

The tractor air brake system of the present invention may include wheel brakes of any known type such as cam brakes or wedge brakes connected to the front and rear wheel brake chambers.

It will be understood that the claims are intended to cover all modifications and variations of the preferred embodiments of the invention.

What is claimed is:

1. In a tractor having front wheels brakes and rear wheel brakes, a tractor air brake system comprising:
   (a) a source of service and emergency air pressure;
   (b) front brake actuators for actuating said front wheel brakes;
   (c) rear brake actuators for actuating said rear wheel brakes;
   (d) an application valve for delivering service air pressure from said source to front and rear brake actuators;
   (e) control valve means, connected between said application valve and said front brake actuators, operating in a first mode to reduce the service air pressure delivered to said front brake actuators relative to the service air pressure delivered to said rear brake actuators when the tractor is operated with a trailer and said tractor air brake system is connected to the trailer brake system;
   (f) said control valve means operating in a second mode to control the service air pressure delivered to said front brake actuators when the tractor is operated without a trailer;
   (g) said control valve means, when operating in said first mode prevents the delivery of service air pressure to said front brake actuators until the service air pressure being delivered to said rear brake actuators reaches a predetermined level; and,
   (h) said control valve means, when operating in said first mode, functions to deliver service air pressure to said front brake actuators at a faster rate than service air pressure is delivered to said rear brake actuators as the service air pressure being delivered to said rear brake actuators is increased from said predetermined level to another, higher predetermined level.

2. The tractor air brake system defined in claim 1, wherein said control valve means operates in said second mode to allow the service air pressure delivered to said front brake actuators to be substantially equal to the service air pressure delivered to said rear brake actuators.

3. The tractor air brake system defined in claim 1, wherein said control valve means operates in said second mode to reduce the service air pressure delivered to said front brake actuators relative to the service air pressure delivered to said rear brake actuators.

4. The tractor air brake system defined in claim 1, wherein said control valve means operates in said second mode to increase the service air pressure delivered to said front brake actuators relative to the service air pressure delivered to said rear brake actuators.

5. The tractor air brake system defined in claim 4, wherein said control valve means, when operating in said second mode, functions to deliver service air pressure to said front brake actuators at a faster rate than service air pressure is delivered to said rear brake actuators.

6. The tractor air brake system defined in claim 1, wherein said another, higher predetermined level is the maximum service air pressure available for delivery from said source to said front and rear brake actuators.

7. The tractor air brake systems defined in claim 1, wherein said control valve means operates in said second mode to allow the service air pressure delivered to said front brake actuators to be at substantially the same rate as service air pressure is delivered to said rear brake actuators.

8. The tractor air brake system defined in claim 1, wherein said control valve means operates in said second mode to reduce the service air pressure delivered to said front brake actuators to be at a faster rate than service air pressure is delivered to said rear brake actuators.

9. The tractor air brake system defined in claim 1, wherein said control valve means comprises:
(a) a housing having an inlet port, an outlet port, and a ratio port;
(b) a primary piston movable in said housing, said primary piston having an upper face defining a first effective area, a lower face defining a second effective area, and an intermediate face defining a third effective area;
(c) a secondary piston movable in said housing and mounted concentrically on said primary piston, said secondary piston having an upper face defining a fourth effective area and a lower face defining a fifth effective area;
(d) an inlet chamber formed in said housing above said primary piston upper face and in fluid communication with said inlet port, said first effective area on said primary piston being subjected to air pressure in said inlet chamber;
(e) an outlet chamber formed in said housing below said primary piston and secondary piston lower faces, said outlet chamber being in fluid communication with said outlet port, said second effective area on said secondary piston being subjected to air pressure in said outlet chamber, said inlet and outlet chambers being sealingly separated and normally not in fluid communication; and (f) a ratio chamber formed in said housing between said primary piston intermediate face and said secondary piston upper face, said ratio chamber being in fluid communication with said ratio port, said third effective area on said primary piston and said fourth effective area on said secondary piston being subjected to air pressure in said ratio chamber, said ratio chamber being sealingly separated from said inlet and outlet chambers.

10. The tractor air brake system defined in claim 9, wherein:
(a) said first effective area is equal to the sum of said second and third effective areas; and
(b) said fourth and fifth effective areas are each equal to said third effective area.

11. The tractor air brake system defined in claim 9, wherein:
(a) said control valve means operates in said first mode when the air pressure in said ratio chamber is at a first preselected level;
(b) said control valve means operates in said second mode when the air pressure in said ratio chamber is at a second preselected level; and
(c) said first preselected level is higher than said second preselected level.

12. The tractor air brake system defined in claim 11, wherein:
(a) said primary piston moves upward and downward in said housing while said secondary piston remains stationary in said housing when the air pressure in said ratio chamber is at said first preselected level in order to reduce the air pressure in said outlet chamber relative to the air pressure in said inlet chamber; and
(b) said primary and secondary pistons move upward and downward together in said housing when the air pressure in said ratio chamber is at said second preselected level in order to control the air pressure in said outlet chamber relative to the air pressure in said inlet chamber.

13. The tractor air brake system defined in claim 9, further comprising:
(a) first conduit means connecting said application valve to said control valve means inlet port for supplying service air pressure to said control valve means inlet chamber; and
(b) second conduit means connecting said source of air pressure to said control valve means ratio port for supplying emergency air pressure to said control valve means ratio chamber.

14. The tractor air brake system defined in claim 13, further comprising:
(a) a tractor protection valve having a service inlet port and a service outlet port each connected with said first conduit means;
(b) said tractor protection valve also having an emergency inlet port and an emergency outlet port each connected with said second conduit means; and
(c) said second conduit means connecting said emergency outlet port of said tractor protection valve to said control valve means ratio port.

15. The tractor air brake system defined in claim 9, wherein said control valve means further comprises check valve means mounted on said primary piston for opening fluid communication between said inlet and outlet chambers in response to movement of said primary piston.

16. The tractor air brake system defined in claim 9, further comprising:
(a) another source of service air pressure;
(b) said control valve means further comprising:
(i) a reservoir port in said housing connected to said another source;
(ii) valve means in said housing for opening and closing fluid communication between said reservoir port and said outlet chamber in response to movement of said primary piston.

17. A control valve for a brake system comprising:
(a) a housing having an inlet port, an outlet port, and a ratio port;
(b) a primary piston movable in said housing, said primary piston having an upper face defining a first effective area, and an intermediate face defining a third effective area;
(c) a secondary piston movable in said housing and mounted concentrically on said primary piston, said secondary piston having an upper face defining a fourth effective area and a lower face defining a fifth effective area;
(d) an inlet chamber formed in said housing above said primary piston upper face and in fluid communication with said inlet port, said first effective area on said primary piston being subjected to air pressure in said inlet chamber;
(e) an outlet chamber formed in said housing below said primary piston and secondary piston lower faces, said outlet chamber being in fluid communication with said outlet port, said second effective area on said primary piston and said fifth effective area on said secondary piston being subjected to air pressure in said outlet chamber, said inlet and outlet chambers being sealingly separated and normally not in fluid communication;
(f) a ratio chamber formed in said housing between said primary piston intermediate face and said secondary piston upper face, said ratio chamber being in fluid communication with said ratio port, said third effective area on said primary piston and said fourth effective area on said secondary piston being subjected to air pressure in said ratio chamber, said ratio chamber being sealingly separated from said inlet and outlet chambers;
(g) said primary piston moving upward and downward in said housing while said secondary piston remains stationary in said housing when the air pressure in said ratio chamber is at a first preselected level in order to reduce the air pressure in said outlet chamber relative to the air pressure in said inlet chamber;
(h) said primary and secondary pistons moving upward and downward together in said housing when the air pressure in said ratio chamber is at a second preselected level in order to control the air pressure in said outlet chamber relative to the air pressure in said inlet chamber; and
(i) said first preselected level being higher than said second preselected level;
(j) check valve means mounted on said primary piston for opening fluid communication between said inlet and outlet chambers in response to movement of said primary piston;
(k) a reservoir port in said housing; and
(l) valve means in said housing for operning and closing fluid communication between said reservoir port and said outlet chamber in response to movement of said primary piston.

18. The control valve defined in claim 17, wherein:
(a) said first effective area is equal to the sum of said second and third effective areas;
(b) said fourth and fifth effective areas are each equal to said third effective area; and
(c) the sum of said second and fifth effective areas is equal to said first effective area.

19. In a tractor air brake system for use on a tractor having front wheel brakes and rear wheel brakes, said tractor air brake system including a source of service and emergency air pressure, front brake actuators for actuating said front wheel brakes, rear brake actuators for actuating said rear wheel brakes, and an application valve for delivering service air pressure from said source to said front and rear brake actuators, the improvement comprising:
(a) control valve means, connected between said application valve and said front brake actuators, operating in a first mode to reduce the service air pressure delivered to said front brake actuators relative to the service air pressure delivered to said rear brake actuators when the tractor is operated with a trailer and said tractor air brake system is connected to the trailer brake system; and
(b) said control valve means operating in a second mode to control the service air pressure delivered to said front brake actuators when the tractor is operated with a trailer;
(c) said control valve means, when operating in said first mode prevents the delivery of service air pressure to said front brake actuators until the service air pressure being delivered to said rear brake actuators reaches a predetermined level; and,
(d) said control valve means, when operating in said first mode, functions to deliver service air pressure to said front brake actuators at a faster rate than service air pressure is delivered to said rear brake actuators as the service air pressure being delivered to said rear brake actuators is increased from said predetermined level to another, higher predetermined level.

* * * * *